Dec. 27, 1955  F. F. DAUENHAUER  2,728,344
HOP VINE CUTTER AND PICKER
Filed March 15, 1952  3 Sheets-Sheet 2
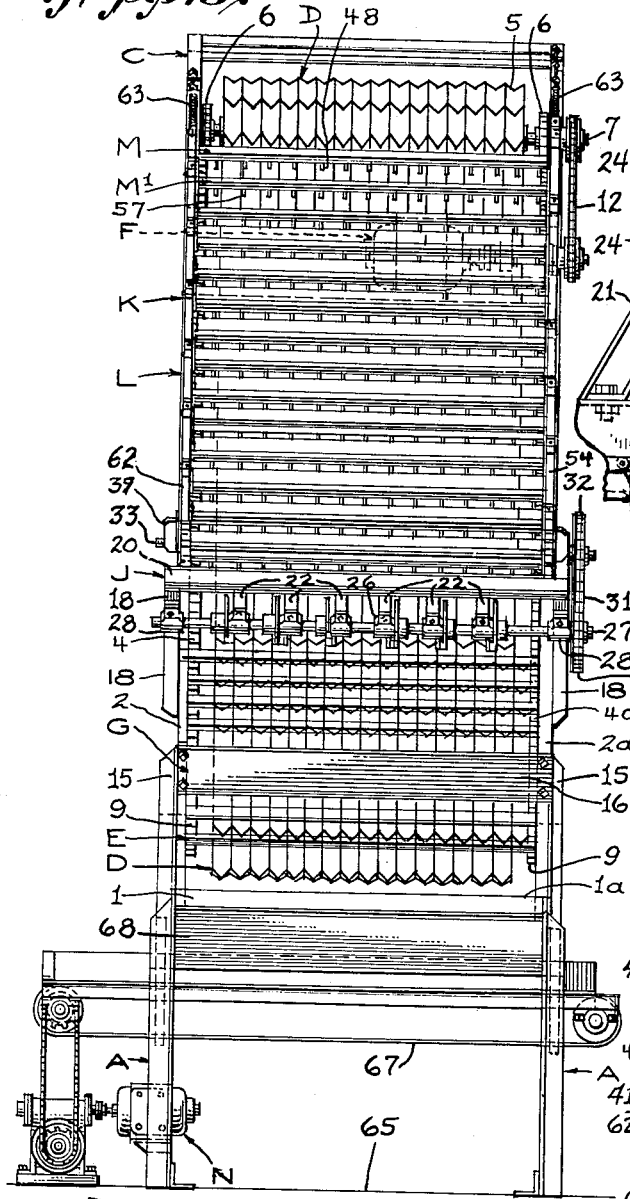
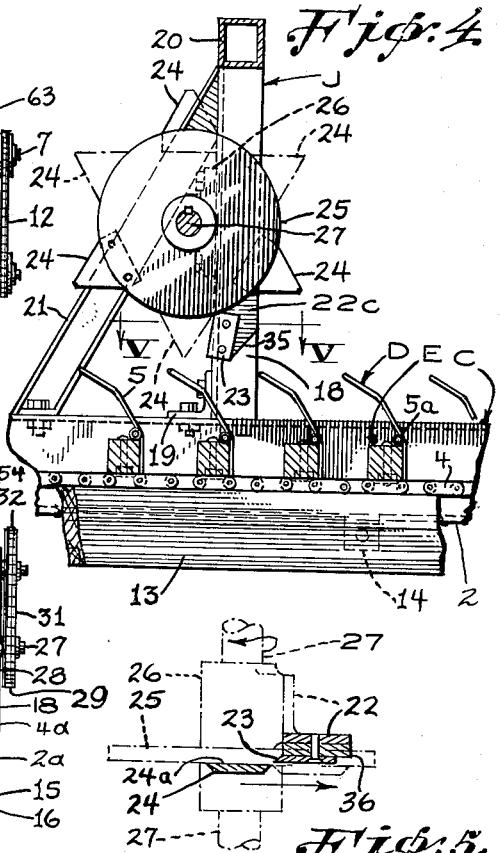
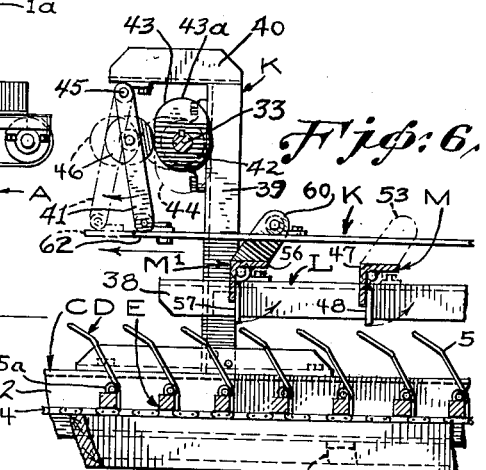
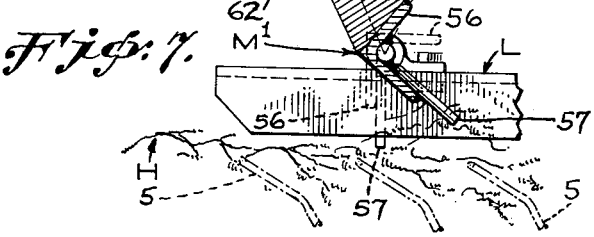
INVENTOR.
FLORIAN F. DAUENHAUER.
BY
ATTORNEYS Dec. 27, 1955 F. F. DAUENHAUER 2,728,344
HOP VINE CUTTER AND PICKER
Filed March 15, 1952 3 Sheets-Sheet 3

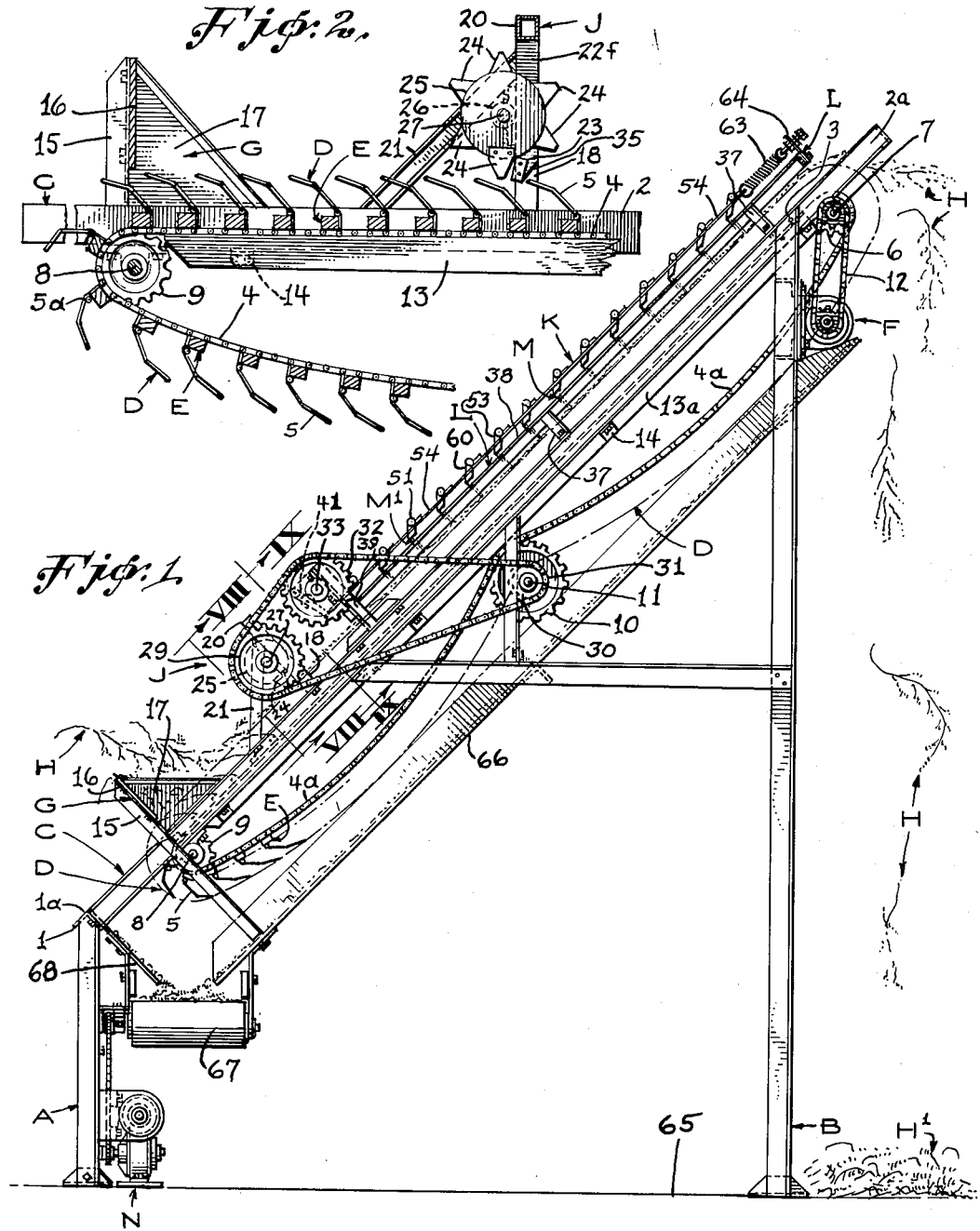

INVENTOR.
FLORIAN F. DAUENHAUER.
BY
Munn & Liddy
ATTORNEYS.

United States Patent Office 2,728,344
Patented Dec. 27, 1955

2,728,344

HOP VINE CUTTER AND PICKER

Florian F. Dauenhauer, Santa Rosa, Calif.

Application March 15, 1952, Serial No. 276,891

2 Claims. (Cl. 130—30)

An object of my invention is to provide a hop picking machine which differs from the invention shown in my copending application on an apparatus for picking hops from hop branches and clusters and for separating leaves and stems therefrom, filed August 16, 1950, Ser. No. 179,724 (now Patent No. 2,681,066, dated June 15, 1954). In the copending case I disclose a branch picker for removing hops from hop branches and hop clusters. The hop branch picker severs the hops from any vine portion or hop clusters. A fixed breaker fork cooperating with a rotary feeder fork acts on the vines to spread them over the combined picker and endless conveyor. A branch or arm picker then acts upon the vines and intermittently stops or retards the movement of the vines along the conveyor. During the temporary holding of the vines, the picking fingers on the conveyor, act to strip the hops from the vines and from the hop clusters.

In the present invention a vine cutter takes the place of the fixed breaker fork and rotary feeder fork shown in the copending case and the cutter tends to spread the hop vines more uniformly over a combined conveyor and hop picker as well as reduce the lengths of the vines by cutting them and thus permit the more ready handling of them during the removal of hops therefrom. The branch or arm picker disclosed in the copending case is also altered in its structure and operation so that the combined endless conveyor and hop picker can have its upper reach movable in a flat plane through this portion of the machine rather than be caused to move at right angles to the plane at a plurality of spaced points, these points being arranged at a like number of stations where the hop vines are temporarily arrested in their movement through the machine.

The present invention makes use of a plurality of vine holding combs and these are positioned above a portion of the upper reach of the endless conveyor and are arranged in two groups. Every other comb is connected to a common comb swinging means and constitutes one group while the remaining alternate combs are connected to a second common comb swinging means and constitute the other group. The combs when in normal position, extend at right angles to the plane of the conveyor portion over which they are positioned and the tines of the combs will hold the vines from movement and permit the hop picking fingers on the conveyor to remove hops from the vines during this holding period.

The comb swinging means will swing one group of combs into vine releasing position and then back into vine holding position and this will be followed by the swinging of the other group of combs into vine releasing position and then back into vine holding position. The vines will therefore move from the vine cutting part of the machine in a stepwise intermittent manner due to the successive combs temporarily holding the vines and then releasing them. During each vine holding period, the hop picking fingers will remove hops from the vines so that when the vines reach the discharge end of the machine, all of the hops will have been removed from the vines.

Other objects and advantages will appear in the following specification, and the novel features of the device will be particularly pointed out in the appended claims.

My invention is illustrated in the accompanying drawings forming a part of this application, in which:

Figure 1 is a side elevation of the hop picking machine;

Figure 2 is an enlarged longitudinal section of the feed and cutter end of the machine, shown in a horizontal rather than in an inclined position;

Figure 3 is a front elevation of the machine when looking from the left-hand side of Figure 1;

Figure 4 is an enlarged transverse section of the branch cutter and is taken along the line IV—IV of Figure 8;

Figure 5 is a horizontal section through a part of the branch cutter and is taken along the line V—V of Figure 4;

Figure 6 is an enlarged longitudinal section of a part of the vine holding combs and is taken along the line VI—VI of Figure 9, this part of the device being shown in a horizontal rather than an inclined position;

Figure 7 is an enlarged sectional view of one of the combs shown in Figure 6, and illustrates the comb in released position in full lines, and in vine holding position by dot dash lines;

Figure 8:
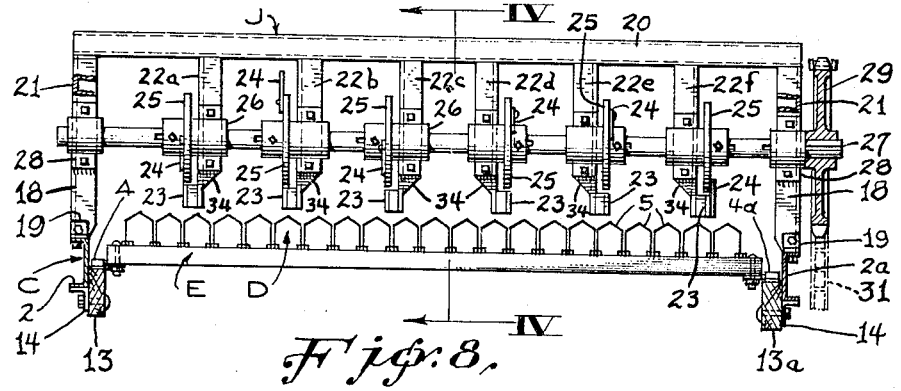
Figure 8 is an enlarged transverse section of the branch cutter and is taken along the line VIII—VIII of Figure 1.

In carrying out my invention, I provide a supporting frame in which the forward legs A are considerably shorter in length than the rear legs B, see Figure 1. In Figure 3, I show the forward legs A with their tops interconnected by an angle-iron 1, and Figure 1 illustrates how the angle-iron is arranged with its vertex 1a facing upwardly so that the two sides of the angle-iron will be inclined downwardly in opposite directions. The main frame C of the machine is inclined upwardly from the angle-iron 1 to the tops of the legs B and is composed of two side channel-irons 2 and 2a, see Figure 9. The channel-iron 2 is disposed at the left-hand side of the frame C and the channel-iron 2a is disposed at the right-hand side when looking at the machine in Figure 3. The forward end of the channel-irons are welded to one side of the angle-iron 1 and they extend up to the tops of the rear legs B and are secured thereto by rivets 3, or other suitable fastening means. The main frame C is inclined upwardly at the angle shown in Figure 1 for a purpose hereinafter described.

I provide an endless conveyor and hop picker indicated generally at D in Figures 1 and 2. Figure 8 discloses the conveyor D as comprising two endless chains 4 and 4a and Figure 4 illustrates how certain links of the chains 4 and 4a support cross bars indicated generally at E. In the present machine the cross bars are preferably disposed four and one-half inches apart, although I do not wish to be confined to any predetermined spacing for the bars. Each cross or finger bar supports a plurality of hop picking fingers 5 of the type shown in Figures 4 and 8. These hop picking fingers are preferably made of wire and are arranged side by side as shown in Figure 8 and extend throughout the entire length of the bar E. In Figure 4 the fingers 5 are illustrated as being attached to one face of the bars E and they have a coil spring 5a formed at the juncture where the finger extends free of the bar. This construction will provide the fingers with the necessary resiliency for picking hops from the vines.

The endless conveyor D extends around sprockets 6 that are mounted on a main drive shaft 7, disposed near the upper end of the main frame C, see Figure 1. An idler shaft 8 is positioned at the feed end of the machine and has sprockets 9 around which the chains 4 and 4a are passed, see also Figure 2. Carryup sprockets 10 are mounted on an intermediate shaft 11 over which a portion of the lower reach of each of the endless chains 4 and 4a pass, see Figure 1.

Also in Figure 1, I show a motor F and this is operatively connected to the main drive shaft 7 by means of an endless chain and sprockets indicated generally at 12, see Figure 3. It will be seen from this construction that the upper reaches of the endless chains 4 and 4a are moved upwardly along the inclined main frame C. It is necessary that the upper reaches of the chains be maintained in a flat plane and to this end I provide two wooden skids or supporting rails shown at 13 and 13a in Figure 8. The two skids are attached to the channel-irons 2 and 2a by brackets 14 which are welded to the channel-irons and are bolted to the skids. About four brackets 14 are shown in Figure 1, although I do not wish to be confined to any particular number.

The upper reaches of the endless chains 4 and 4a ride along the upper edges of the wooden skids 13 and 13a, respectively. The tops of the wooden skids lie substantially midway between the upper and lower flanges of the channel-irons 2 and 2a and therefore the channel-irons act as guides for the chains and the bars E and will prevent undue lateral movement of the bars as they travel over the skids. The wooden skids extend from the idler sprockets 9 up to the drive sprockets 6 and therefore the upper reach of the conveyor D will be held in a flat plane that is upwardly inclined.

At the lower front end of the machine, as indicated in Figure 1, I provide a hopper indicated generally at G. This hopper consists of a pair of supporting members 15 that are secured to the channels 2 and 2a of the main frame C. A board 16 extends between the supporting members 15 and is secured thereto, the board preferably lying at right angles or perpendicular to the plane of the frame C. Side members 17 parallel the channels 2 and 2a and are secured to the supporting members 15 to form the sides of the hopper. I do not wish to be confined to any particular shape of hopper. In Figure 1 the hop vines and branches indicated generally at H are shown being tossed into the hopper and the latter feeds the vines and branches directly on to the entrance end of the upper reach of the combined endless conveyor and hop picker D.

My machine can be used as a hop picker for receiving hop vines and branches that have been transported directly from the hop field. It is also possible to use my machine as a continuation of the hop picking machine shown in my copending application, Serial No. 179,722, filed August 15, 1950 (now Patent No. 2,677,378, dated May 4, 1954). When the present machine is used as a device for receiving hop clusters and broken off vine portions from the machine shown in my copending case just mentioned, the machine will deliver such hop clusters and broken vine branches directly into the hopper G. It will therefore be seen that my machine can be used without any other machine that first removes hops from hop vines, or it may be used with the machine shown in my copending case above mentioned.

It is preferable to cut the vines or vine branches H and to distribute them substantially uniformly over the upper reach of the conveyor and hop picker D so that the hop picking fingers 5 will have access to all portions of the vines and will remove hops therefrom. In Figures 1 to 5, inclusive, I illustrate the branch cutter J which is designed for this purpose and this will be described in detail. In both Figures 2 and 4, the channel-iron 2 is shown supporting one of two uprights 18. Figure 8 illustrates these two uprights and Figure 4 shows brackets 19 or other suitable fastening means securing the uprights to the two channels. A box beam 20 extends across the tops of the uprights 18 and is secured thereto. Bracing members 21 are shown extending from the channels 2 and 2a up to the tops of the uprights 18.

In Figure 8 I illustrate how the box beam 20 supports a plurality of depending arms 22a to 22f, inclusive, and these arms terminate above the upper reach of the conveyor D as clearly shown in Figures 2, 4 and 8. A stationary cutting blade 23 is secured to the lower end of each of the six arms 22a to 22f, inclusive, and is designed to arrest the movement of the hop vines as they are carried along by the upper reach of the combined endless conveyor and hop picker D. Each stationary blade 23 cooperates with a movable single blade 24 that is mounted on a revolvable disc 25. I provide each of the six depending arms 22a to 22f, inclusive, with a bearing 26. The shaft 27 is mounted in the bearings 26 and has its ends mounted in bearings 28 that in turn are carried by the uprights 18. A sprocket 29 is keyed to the shaft 27 and Figure 1 shows this sprocket operatively connected to the intermediate shaft 11 by a sprocket 30 and a sprocket chain 31. The sprocket chain 31 also passes around another sprocket 32 which is mounted on the shaft 33 for rotating the shaft with the shaft 29. The shaft 33 is used in connection with the vine branch comb mechanism indicated generally at K and which intermittently holds the vines as they are advanced along the main frame C by the upper reach of the conveyor D.

Again returning to the construction of the branch cutter J, it will be seen that although the discs 25 which are keyed to the shaft 27 each carry a cutting blade 24, these blades are positioned on the discs so that they will coact with their stationary blades 23 in a prearranged manner. The depending arms are lettered from 22a to 22f, inclusive, starting from the left hand side of Figure 8. The single blades 24 on the discs 25 will engage with their stationary blades 23 in the following order as the shaft makes one complete revolution: 22f, 22c, 22e, 22b, 22d and 22a. The reason for this cutting order is to distribute the cutting actions of the blades 24 around the complete circumference of the shaft 27 every sixty degrees so that the machine will not be subjected to an undue cutting strain which would occur if all of the cutting blades should pass the stationary blades at the same time and do their cutting action at once. A further reason for arranging the cutting blades in the manner indicated is to cause the vine branches H that might engage with the stationary blades 23 to be cut in lengths at least as long as the distance between any consecutive three of the stationary blades 23.

It will further be seen that the discs 25 are rotated in a counter-clockwise direction when looking at Figure 4, and therefore the cutting blades 24 will move downwardly toward the conveyor D before they pass their stationary blades 23, and this downward movement will tend to force the vine branches H toward the upper reach of the conveyor D and prevent any piling up of the vines in front of the cutting mechanism J. As the cutting mechanism carries its blades 24 past the stationary blades 23, the vines will be released from "hanging up" on the stationary blades 23 and will move on with the movement of the conveyor D because these vines will be cut. In this way the bunching up of the vines in front of the branch cutter J is prevented and there will be an even flow of the cut branches from the branch cutter and toward the vine branch holding comb mechanism K.

In Figure 5 I show the relation of the stationary blade 23 with respect to the cutting blade 24 that is mounted on the revolving disc 25. Each of the six depending arms 22a to 22f, inclusive, is preferably of an angle-iron construction and the portion of the arm that carries the stationary blade 23 has its forward and transversely extending web portion cut away as at 34 and clearly shown in Figure 8. In addition, the lower end of each of the arms 22a to 22f that supports a stationary blade 23 is cut at an angle as clearly shown at 35 in Figure 4 and a spacer member 36 is placed between the angle-iron and the stationary blade 23 so as to bring the outer face of the blade into the same plane as the inner face 24a of the rotating blade 24, see Figure 5. A shearing action therefore results as the movable cutting blade 24 passes the stationary cutting blade 23. This construction holds true for all of the arms 22a to 22f, inclusive, which are illustrated in Figure 8.

Figures 10, 11:
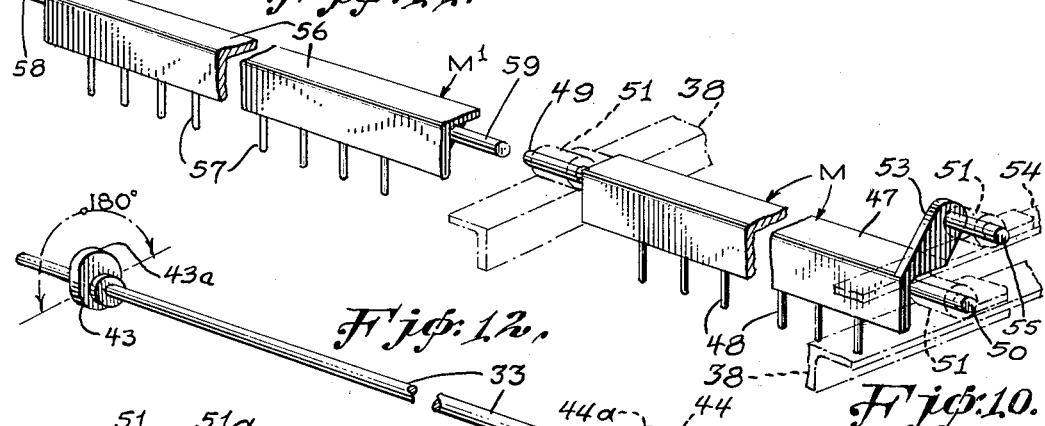
Figure 10 is an enlarged isometric view of one of the vine branch holding combs in one group of combs.
Figure 11 is an enlarged isometric view of one of the vine branch holding combs in the second group of combs.
Figures 12, 13:
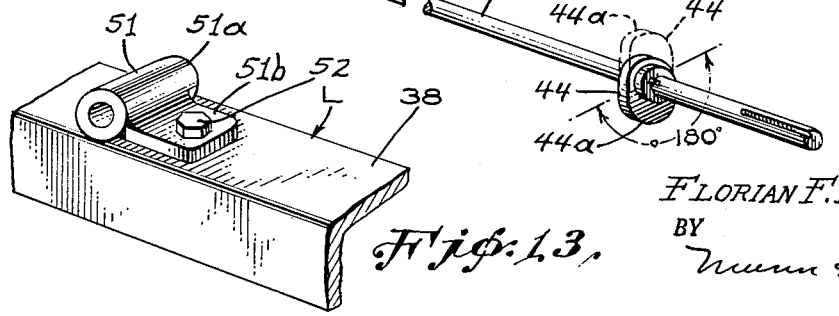
Figure 12 is an enlarged isometric view of the cam shaft and two cams.
Figure 13 is an enlarged isometric view of one of the bearings that rotatably supports an end of one of the vine holding combs.

I will now describe the vine branch holding comb mechanism and this is illustrated in Figures 1, 6, 7, and 9 to 13, inclusive. This is the mechanism that will stepwise permit the advancement of the vines over the frame C from the branch cutter J to the discharge end. During the holding of the vines between successive steps, the combined conveyor and hop picker D, will remove hops from the vines. In Figure 1, I show an auxiliary frame L that is spaced above the main frame C and lies parallel therewith. The auxiliary frame L is shown in detail in Figures 6 and 9. Supports 37, see Figure 1, are connected to the main frame C and carry angle-irons 38 that form the sides of the auxiliary frame L. I show two such supports for each angle-iron 38. Again referring ot Figure 6, it will be seen that the main frame C has uprights 39 that extend perpendicular to the channel-irons 2 and 2a and are connected thereto so as to be supported thereby. At the tops of the two uprights 39 I provide supporting members 40 that extend at right angles to the uprights 39 and face toward the hopper G. The supports 40 pivotally carry pairs of cam follower arms 41, see Figures 6 and 9. The uprights 39 support bearings 42 and these in turn rotatably carry the cam shaft 33. In Figure 12 I show the cam shaft 33 and illustrate how this shaft is provided with two cams, a cam 43 placed near one end of the shaft and a cam 44 placed near the other end of the same shaft. Each cam has a single lobe or high point and the lobes 43a and 44a of the two cams face in opposite directions so as to be 180° apart.

Figure 9:
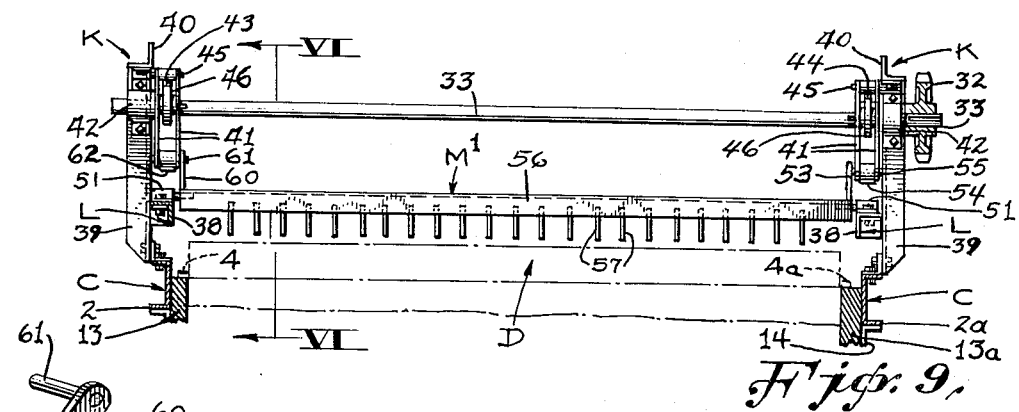
Figure 9 is an enlarged transverse section showing one of the vine branch holding combs, and is taken along the line IX—IX of Figure 1.

From Figure 9, it will be seen that each cam follower arm 41 is in reality a pair of arms that are pivoted at 45 to the supporting member 40. A cam follower roller 46 is mounted between each pair of arms 41 and is rotatably carried thereby. The cam follower rollers 46 ride on the cams 43 and 44 and as the shaft 33 is rotated, the cams will cause the rollers 46 to swing the cam follower arms from the full to the dot dash line positions shown in Figure 6. The purpose of this alternate swinging movement of the pairs of cam follower arms 41 caused by the rotation of the cams 43 and 44, will now be set forth.

In Fig. 10 I illustrate a comb at M and this comb is formed from an angle-iron 47 that has tines 48 welded to one side thereof and extending downwardly toward the conveyor D when the comb is in normal position. The angle-iron 47 has trunnions 49 and 50 extending from its ends and these trunnions are rotatably mounted in bearings 51 that in turn are welded or otherwise secured to the angle-iron 38 forming the sides of the auxiliary frame L. In Figure 13 I show a detail of one of the bearings 51. The bearing comprises a cylindrical portion 51a that is welded to a flat piece 51b and the latter is secured to the angle-iron 38 by any suitable fastening means such as a cap screw 52.

It will be noted from Figure 1, that the angle-iron 47 has an upwardly extending arm 53 disposed at the right-hand side of the member 47 when looking at Figure 10. A connecting rod strip 54, see also Figure 1, carries upper bearings 51 of the type shown in Figure 13 and the arm 53 has a pin 55 that is rotatably received in the upper bearing 51, see Figure 10. In Figure 1, I show the connecting rod strip 54 extending from a point adjacent to the uprights 39 to a point near the upper end of the auxiliary frame L and the strip 54 parallels the plane of the auxiliary frame L and overlies it.

I provide a plurality of the combs M and rotatably mount these on the auxiliary frame L and connect their arms 53 to the connecting rod 54 by the upper bearings 51. The combs M are preferably spaced at a uniform distance from each other throughout the length of the connecting rod strip 54. In Figure 9, I show the forward end of the connecting rod strip 54 connected by a bearing 51 to the cam follower pair of arms 41 disposed on the right-hand side of the machine. It will be seen that as the right-hand cam follower pair of arms 41 are swung between the full and dot-dash line position in the same manner as shown for the left-hand pair, shown in Figure 6, the connecting rod strip 54 will impart a swinging motion to the spaced-apart combs M and will swing them from the full line vine holding position shown in Figure 6 into vine releasing position.

I wish to cause all of the spaced combs M to swing as a unit or group and to be actuated by the right hand pair of cam follower arms 41 shown in Figure 9. I further provide a second group of vine-holding combs M1, one of them being shown in Figure 11, and dispose one of each of these between adjacent combs M of the first group. Each comb M1 includes an angle-iron 56 which is identical to the angle-iron 47 in the provision of the downwardly extending and spaced-apart tines 57, and also in the end trunnions 58 and 59. However, the angle-irons 56 have arms 60 disposed at the left-hand ends of the angle-irons rather than at the right-hand ends, as is true of the arms 53 on the angle-irons 47. The trunnions 58 and 59 are mounted in bearings 51, see Figure 9, that are placed between similar bearings 51 that pivotally support the combs M. The arms 60 carry pins 61 that are received in upper bearings 51 which in turn are mounted on a second connecting rod strip 62 that has its forward end connected to the pair of cam follower arms 41 disposed at the left-hand side of the machine as shown in Figures 6 and 9.

It will be seen that a reciprocation of the second connecting rod strip 62, see Figure 6, caused by its pair of cam follower arms 41, will swing the combs M1 from a position where the tines 57 extend perpendicular to the plane of the frame C into a position where the tines will extend at an angle to the plane, see the full line position in Figure 7. In Figure 1, I show a coil spring 63 connected to the free end of the connecting rod strip 54 and this spring is adjustably secured at 64 to the end of the auxiliary frame L. I provide a spring 63 for each connecting rod strip 54 and 62 and these springs will tend to keep the cam follower rollers 46 riding on the cams 43 and 44. The connecting rod 54 will be reciprocated once for each revolution of the shaft 33 and the connecting rod 62 will also be reciprocated once for the rotation of the same shaft, but only after 180° rotation of the shaft after the connecting rod 54 has been reciprocated. The cam lobes 43a and 44a are arranged 180° apart on the shaft 33 as illustrated in Figure 12, and therefore the connecting rods 54 and 62 will be intermittently reciprocated, with one connecting rod remaining stationary while the other is being reciprocated and vice versa.

Since the connecting rod 54 is operatively connected to all of the first group of combs M, and inasmuch as the connecting rod 62 is operatively connected to all of the second group of combs M1, the group of combs M will be rocked into an inclined position for releasing any hop vine branches clinging thereto, while the combs M1 will hold other hop vine branches from moving with the upper reach of the conveyor D. The wire hop picking fingers 5 will remove hops from the vine branches being retained by the tines 57 of the combs M1. When the shaft 33 rotates 180° more, the connecting rod 62 will swing the combs M1 into an inclined position to release the hop vines clinging thereto while the tines 48 of the combs M will remain in a vertical position and hold any hop vines that might engage therewith. The combs M alternate with the combs M1 in swinging and therefore there will be an intermittent holding movement of, say, the first group of combs M while the second group of combs M1 are swung into released position for freeing all of the hop vines clinging thereto and the freeing of the hop vines will be accomplished at equal spaced points along the conveyor portion D that is disposed under both groups of combs. A moment later, all of the first group of combs M will be swung into released position for freeing any hop vines clinging thereto while the second group of combs M1 will occupy a hop vine holding position.

The result of this mechanism in cooperation with the conveyor D, is an intermittent and stepwise movement of the hop vines along the portion of the conveyor D over which the combs are positioned. Between movements of the hop vines, the hop picking fingers 5 will remove hops from the vines that are temporarily held from moving. I found that this type of intermittent holding and stepwise moving of the hop vines coupled with the continual movement of the picking fingers 5, results in the effective stripping of all hops from the vines as they pass through the machine. When, therefore, the hop vines H reach the top or discharge end of the frame C, the conveyor D as it passes around the sprockets 6 at this end, will eject the hop vines from the machine and the latter will drop on to a pile H1 on the ground 65.

From the foregoing description of the various parts of the device, the operation thereof may be readily understood.

In Figure 1 I show an inclined chute 66 that is placed under the main frame C and is disposed parallel with the frame. This chute receives any hops that are stripped from the vines by the hop picking fingers 5. The hops roll by gravity downwardly over the inclined chute 66 and are deposited on a horizontal conveyor 67 where they may be carried to a hop cleaning device if desired. Any mechanism may be used for operating the conveyor 67 and I have indicated a mechanism generally at N in Figure 1.

The hop vines H are fed into the hopper G and will travel upwardly due to the movement of the upper reach of the conveyor D. As the vines reach the branch cutter J, they will be momentarily held by the spaced-apart stationary blades 23 and the rotating blades 24 will cut the branches into smaller lengths and at the same time free them from the stationary blades so that the branches will now be carried by the conveyor D from the branch cutter J to the vine branch holding comb mechanism K. I have shown two groups of combs M and M1 each containing seven combs, although I do not wish to be confined to any particular number. The combs M alternate with the combs M1 and, as already stated, the combs M will be swung into released position once for each time the shaft 33 is rotated. The same is true for the combs M1 and their swinging into released position will be after the shaft 33 has rotated 180° from the position it occupies when the cam 44 swings the combs M into released position.

So long as the tines 48 of the combs M, for example, remain at right angles to the plane of the conveyor belt portion D disposed there below, the vine branches contacting these tines will be held against movement and therefore the conveyor D will move with respect to these held branches and the wire hop picking fingers 5 will remove hops therefrom. When the combs M swing for freeing the branches they are holding, the conveyor D will move these branches to the next group of combs M1, whose tines 57 will for that moment be extending at right angles to the plane of the conveyor D and therefore the branches will be held by these tines. The result will be a further picking of the hops from the vines by the hop picking fingers 5 that pass by the vines while the latter are being held from movement by the combs M1. These combs are then swung into released position and the conveyor D will move the released vines to the first group of combs M and thus the operation is repeated continuously as the vines move step by step along the main frame C, from comb M to comb M1, etc.

The conveyor D therefore performs the dual function of picking hops from the vines H while the vines are being momentarily held by either the group of combs M or the group of combs M1 and then the same conveyor will act as a source of power for moving the vines, released by the combs, to the next set of combs which are not at that moment in released position. I have found that the two groups of seven combs each are sufficient to pick all of the hops from the vines H. As fast as the hops are picked by the fingers 5 they will be dropped down between the bars E of the conveyor and will be conveyed by the inclined chute 66 to the conveyor 67. The vines after being picked clean of hops, will be ejected from the machine at the upper end of the main frame C and will drop by gravity on to the ground 65. A baffle board 68 cooperates with the inclined chute 66 for delivering picked hops to the upper reach of the endless conveyor 67.

The method of hop picking broadly set forth in my copending application, Ser. No. 179,724, (now Patent No. 2,681,066, dated June 15, 1954) is also followed by the operation of my present machine. In the copending case, the stationary and rotary forks spread the vines substantially uniformly over the combined conveyor and hop picker and longer vines are cut into shorter lengths by the two coacting forks. The vine cutter in the present machine with its stationary and rotary blades accomplishes the same purpose more efficiently.

Again in the copending case just mentioned, the pairs of combs cooperated with each other and with the moving conveyor for intermittently and stepwise holding the vines at spaced points along the length of the conveyor while the hop picking fingers acted on the vines for removing hops during the time the vines were held against movement. Working in conjunction with the vine holding combs in the companion case, the conveyor is provided with a plurality of troughs, one for each pair of combs, and the purpose is to permit the conveyor to continuously move whether the individual combs are in operative (vine holding) or inoperative (vine releasing) position. In the present case, the forming of portions of the endless conveyor and hop picker into troughs that are spaced one from the other, is done away with. Instead, the portion of the endless conveyor and hop picker that moves under the spaced apart combs, is maintained in a flat plane and novel means is provided for swinging every other comb from a vine-holding into a temporary vine-releasing position while the remaining combs will hold any vines engaging therewith, from moving; and then the same means will swing the remaining combs into vine-releasing position while the first group will be returned and held in vine holding position.

The rotary cutter blades 24 are arranged on their discs 25 so that for every sixty degree rotation of the shaft 27, one blade 24 will pass its stationary blade 23 and cut any vine that contacts the stationary blade. The cutting order of the blades 24 is such that any vines that become lodged against the stationary blades 23, will be cut to proper length before entering the portion of the conveyor associated with the holding combs M and M1. Moreover, the cutting order of the blades 24 is such that wadding of the vines against the stationary blades 23 is prevented and this will permit the hops to hang freely from the vines.

The picking fingers 5 of the endless conveyor, pull off any depending hops from vines that are temporarily held by the combs M or M1. The vines H as they move from one set of combs M to the other set of combs M1, will be free to turn or tumble and cause their hops to hang in positions where they will be removed by the hop picking fingers 5 as the vines are temporarily held by the combs M1. This process is repeated as the vines move successively from the first comb M to the second comb M1 and then to the third comb M, etc., to the discharge end of the machine. The picked hops will fall between the bars of the endless conveyor and will drop onto the inclined chute 66. The main frame C is inclined to reduce the ground space necessary for the machine. Also the upper and lower reaches of the endless conveyor D are inclined so as to parallel the chute 66.

I claim:

1. In a hop-picking machine: an endless conveyor having an upper reach positioned to have hop vine parts placed thereon; a drive mechanism connected to the conveyor, and being operable to move the conveyor, and thereby advance the hop vine parts; hop-picking fingers carried by the conveyor and projecting therefrom to strip hops from the vine parts, when the conveyor is moved relative to the vine parts; a beam supported above said reach of the conveyor to extend transversely thereacross; a plurality of spaced-apart arms secured to the beam end depending therefrom toward said reach of the conveyor; each of these arms having a stationary cutting blade fixed thereto and projecting downwardly therefrom; these stationary blades being disposed adjacent to and above the hop-picking fingers of said upper reach of the conveyor; these stationary cutter blades being positioned to engage with the vine parts to temporarily arrest forward movement of the vine parts, whereby the hop-picking fingers will strip hops from the arrested vine parts; a rotatable shaft mounted parallel with said beam, and extending transversely across said reach of the conveyor, at an elevation above said stationary cutter blades; a series of discs secured to said shaft to rotate therewith; one disc being provided for and disposed above each of the stationary cutter blades; each disc having a blade fixed thereto and projecting therefrom; the cutter blades on the discs being disposed to coact with said stationary blades to cut hop vine parts moved into positions therebetween by the conveyor; and a drive mechanism connected to said shaft, and being operable to turn said discs in a direction for moving the blades on the discs downwardly toward said conveyor reach in a descending path, while approaching the stationary cutter blades; the blades on the discs projecting from the peripheries of the discs to engage with any vine parts disposed in their paths, as these blades descend, thereby forcing the vine parts downwardly against said reach of the conveyor for engagement by the hop-picking fingers, whereby the latter will advance the arrested vine parts as soon as they are cut, thus precluding excessive accumulations of vine parts in front of the stationary blades; the blades being staggered angularly relative to one another.

2. In a hop-picking machine: an endless conveyor having an upper reach positioned to have hop vine parts placed thereon; said reach defining a plane; a drive mechanism connected to the conveyor, and being operable to move the conveyor, and thereby advance the hop vine parts; hop-picking fingers carried by the conveyor and projecting therefrom so as to strip hops from the vine parts, when the conveyor is moved relative to the vine parts; a plurality of spaced-apart combs extending transversely across said conveyor reach above the latter, and each having a series of tines defining tip ends; these combs being arranged in succession along the length of said conveyor reach; the combs being journalled on trunnions for swinging about axes that extend parallel with said reach of the conveyor; said tines being movable into substantially right angles relative to the plane of said conveyor reach, with the tip ends of the tines being disposed adjacent to the hop-picking fingers on said reach, when the combs are swung on one direction, to thereby temporarily arrest forward movement of the vine parts, whereby the fingers will strip hops from the vine parts; the combs further being swingable in the opposite direction, with the tines sloping in the direction of travel of said reach of the conveyor, and with the tines retracted from engagement with the vine parts, whereby the reach will advance the vine parts therewith beneath the sloping tines; strips interconnecting alternate combs into a first-named group for swinging as a unit; strips interconnecting the remaining combs into a second-named group for swinging as a unit; and an oscillatory drive operable for alternately swinging the combs of first one group and then the other group into vine-arresting positions; said oscillatory drive being made to retract the tines of one group of combs from engagement with the vine parts as the other group of combs are moved into engagement with the vine parts, whereby the vine parts may be advanced stepwise by the conveyor reach.

References Cited in the file of this patent

UNITED STATES PATENTS

| | | |
|---|---|---|
| 642,597 | Fosnot | Feb. 6, 1900 |
| 689,992 | Slutz | Dec. 31, 1901 |
| 968,001 | Trowbridge | Aug. 23, 1910 |
| 1,250,466 | Jockisch | Dec. 18, 1917 |
| 1,462,123 | Phelps | July 17, 1923 |
| 1,803,131 | Pierson | Apr. 28, 1931 |
| 2,281,846 | Klein | May 5, 1942 |
| 2,608,973 | Coons | Sept. 2, 1952 |
| 2,647,521 | Miller | Aug. 4, 1953 |
| 2,681,066 | Dauenhauser | June 15, 1954 |